(12) United States Patent
Naber et al.

(10) Patent No.: US 9,695,538 B2
(45) Date of Patent: Jul. 4, 2017

(54) BALANCE RING AND FASTENER GUIDE FOR A WASHING MACHINE

(75) Inventors: Christopher Nils Naber, Louisville, KY (US); Gary M. Barr, Bardstown, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 1168 days.

(21) Appl. No.: 13/417,664

(22) Filed: Mar. 12, 2012

(65) Prior Publication Data

US 2013/0233028 A1 Sep. 12, 2013

(51) Int. Cl.
*D06F 37/24* (2006.01)
*F16F 15/36* (2006.01)

(52) U.S. Cl.
CPC .......... *D06F 37/245* (2013.01); *F16F 15/363* (2013.01); *Y10T 74/2109* (2015.01)

(58) Field of Classification Search
CPC ........ D06F 23/04; D06F 37/12; D06F 37/245; D06F 37/24
See application file for complete search history.

(56) References Cited

U.S. PATENT DOCUMENTS

| | | | | |
|---|---|---|---|---|
| 2,948,401 A * | 8/1960 | Obermajer | ..................... | 210/365 |
| 3,610,069 A * | 10/1971 | Tanner | ........................... | 74/523 |
| 3,914,832 A * | 10/1975 | Petrus | ......................... | 24/274 R |
| 4,388,841 A * | 6/1983 | Gamble | ....................... | 74/572.4 |
| 4,502,303 A | 3/1985 | Wasemann | | |
| 4,646,545 A * | 3/1987 | Fanson et al. | ................. | 68/23.2 |
| 5,215,281 A * | 6/1993 | Sherman | ............... | F16L 55/035 |
| | | | | 248/219.4 |
| 6,778,353 B1 * | 8/2004 | Harper | .................... | G01M 1/36 |
| | | | | 360/99.08 |
| 2013/0227994 A1* | 9/2013 | Naber | ..................... | D06F 23/04 |
| | | | | 68/13 R |

FOREIGN PATENT DOCUMENTS

WO     WO 9950495 A1 * 10/1999

* cited by examiner

*Primary Examiner* — Michael Barr
*Assistant Examiner* — Rita Adhlakha
(74) *Attorney, Agent, or Firm* — Dority & Manning, P.A.

(57) ABSTRACT

A balance ring for an appliance, such as e.g., a washing machine, is provided. The balance ring can reduce or eliminate features such as sink marks that might otherwise impede the movement of counterweights in the balance ring. The counterweights are used to stabilize a rotating element of the appliance.

15 Claims, 6 Drawing Sheets

BALANCE RING AND FASTENER GUIDE FOR A WASHING MACHINE

FIELD OF THE INVENTION

The subject matter of the present disclosure relates generally to a balance ring for an appliance.

BACKGROUND OF THE INVENTION

During the operation of a washing machine, particularly during spin cycles, the machine can sometimes experience an extreme vibration. These vibrations can even cause displacement of the washing machine as it "walks" across a surface such as a floor. Typically, this event is due to the different shapes and densities of the clothing or objects that are being washed which, after the washing cycle and the draining of the wash basket, can stick together and cause differences in the center of mass inside the wash basket. The vibration problem can also be caused by the introduction of relatively heavier objects into the washing basket such as e.g., shoes.

By way of example, after the wash cycle and the draining of the wash fluid from the basket, the shoes may be located on one side of the wash basket or positioned in a manner that causes the center of mass of the rotating system to be off center. As the wash basket is rotated, particularly at high speeds during e.g., a spin cycle, the off centering and centrifugal forces create an imbalance that can generate undesired strain in the washing machine components, an undesirable level of noise, and/or "walking" of the appliance. In an extreme or prolonged situation, the imbalance created by the excessive vibration can also wear-out and damage the washing machine components.

As a result, in order to prevent this imbalance, various devices have been proposed. For example, washing machines have been equipped with balance rings, which are typically hollow rings that rotate with the wash basket. Inside the ring (or toroid) a weight such a liquid or solid balls have been inserted. During operation, the ring will act as a counterweight to the imbalance because the liquid or solid balls will move to a position within the ring that counters the centrifugal forces created by the articles in the wash and thereby balance the basket during rotation. Balance rings of various configurations including chambers, partitions, and other elements to improve the balancing effect have also been proposed.

For washing machines, the above mentioned balance rings are typically attached or connected in some manner with the wash basket or other rotating component. For example, for a vertical axis washing machine, the balance ring can be attached to the top and/or bottom of the wash basket chamber. For a horizontal axis washing machine, it can be attached to the front, back, or both ends of the washing chamber.

With balance rings that incorporate counterweights within the balance ring, it is important that such weights move freely within the annular spaces of balance ring so as to readily provide a counter balance during spinning of the wash basket. If the counterweights become stuck at a certain position in the balance ring or cannot move freely, then the balance ring will not be able to counter an imbalance in the wash basket.

Balance rings can be constructed from a variety of materials including plastics. Using e.g., injection molding, one or more parts can be created from plastic materials and then combined to create the balance ring. Certain challenges exist with using plastic to create the balance ring. For example, in the molding of the plastic parts of the balance ring, the plastic is injected in a molten state into the mold and then allowed to cool. As the plastic cools, it typically solidifies from the outside of the mold surface towards the inside of the mold. In thicker sections of the plastic part, this can result in stresses that pull inwardly on the part as the plastic contracts so as to create depressions—sometimes referred to as sink marks—on the surfaces of the plastic part. For a balance ring, such sink marks can be formed on one or more surfaces that form the annular space inside the ring through which the counterweights must move during rotation of the wash basket. These sink marks can undesirably impede the movement of the counterweight as discussed above.

Accordingly, a balance ring for balancing the load of a rotating element within an appliance, such as e.g., the wash basket of a washing machine, would be beneficial. More particularly, a balance ring constructed so as to eliminate or minimize sink marks so that one or more counterweights within the ring can move freely would be useful.

BRIEF DESCRIPTION OF THE INVENTION

Aspects and advantages of the invention will be set forth in part in the following description, or may be obvious from the description, or may be learned through practice of the invention.

In one exemplary embodiment, the present invention provides a washing machine that includes a wash tub and a wash basket mounted in the wash tub that is rotatable about an axis of rotation. The wash basket has an opening for receiving wash fluid and a wash load therein. The wash basket includes an external surface extending circumferentially about an axis of rotation of the wash basket. A motor is in mechanical communication with the wash basket and is configured for causing the wash basket to rotate. A balance ring is mounted to a rotating member of the washing machine. For example, the rotating member could be the wash basket or the motor. The balance ring is configured to offset imbalances created by articles in the wash tub when the wash basket is rotated by the motor. The balance ring defines an annular space extending circumferentially. At least one fastener guide is provided for attaching the balance ring to the wash basket. The fastener guide includes a pair of legs extending from the balance ring and spaced apart from each other along a radial direction that is perpendicular to the axis of rotation of the wash basket. A boss extends along the radial direction and is connected to the pair of legs and extends therebetween without otherwise being connected to the balance ring. The boss defines an opening. A fastener is received into the opening of the boss and connects the balance ring to the wash basket.

In another exemplary embodiment, the present invention provides a balance ring for stabilizing a rotating element of an appliance. The balance ring defines circumferential and radial directions. The balance ring has an annular space and includes a radially inner wall and a radially outer wall spaced apart along the radial direction from the radially inner wall. The annular space is positioned at least partially between the radially inner wall and the radially outer wall. A top extends between the radially inner and outer walls. A bottom extends between the radially inner and outer walls. A fastener guide is provided that includes a radially inner leg extending from the radially inner wall and away from the bottom and a radially outer leg extending from the radially outer wall and away from the bottom. A channel connects between the radially inner leg and the radially outer leg and is separated from the bottom. The channel defines an aperture extending along the radial direction at least partially through the channel.

In still another exemplary embodiment, the present invention provides a washing machine that includes a wash tub and a wash basket mounted in the wash tub, rotatable about an axis of rotation, and configured for the receipt of laundry articles therein. The wash basket defines a wall extending circumferentially about the wash basket. A motor is in mechanical communication with the wash basket and is configured for causing the wash basket to rotate. A balance ring is mounted onto the wall of the wash basket. The balance ring has an annular space extending circumferentially about the wash basket. At least one fastener guide is provided for attaching the balance ring to the wall of the wash basket. The fastener guide includes a pair of legs extending from the balance ring and a boss that extends between distal ends of the pair of legs and is otherwise separated from the balance ring. The boss defines an opening for the receipt of a fastener. The fastener is positioned in the opening of the boss and connects the balance ring to the wall of the wash basket.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
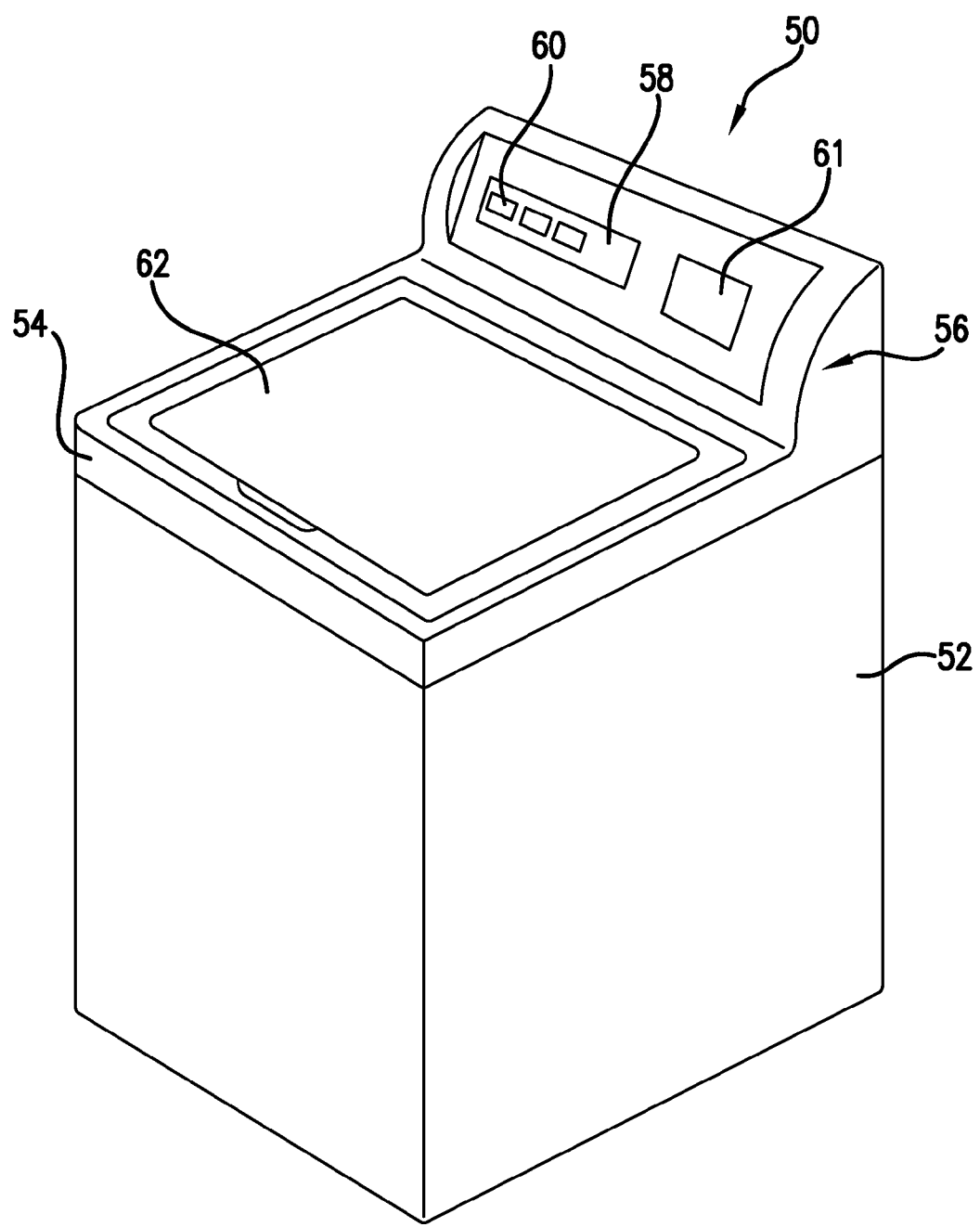
FIG. 1 provides a perspective view of an exemplary embodiment of a washing machine appliance of the present invention.

The present invention provides a balance ring for an appliance, such as e.g., a washing machine. More particularly, a balance ring is provided that can reduce or eliminate sink marks that might otherwise impede the movement of counterweights in the balance ring. The counterweights are used to stabilize a rotating element of the appliance. Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
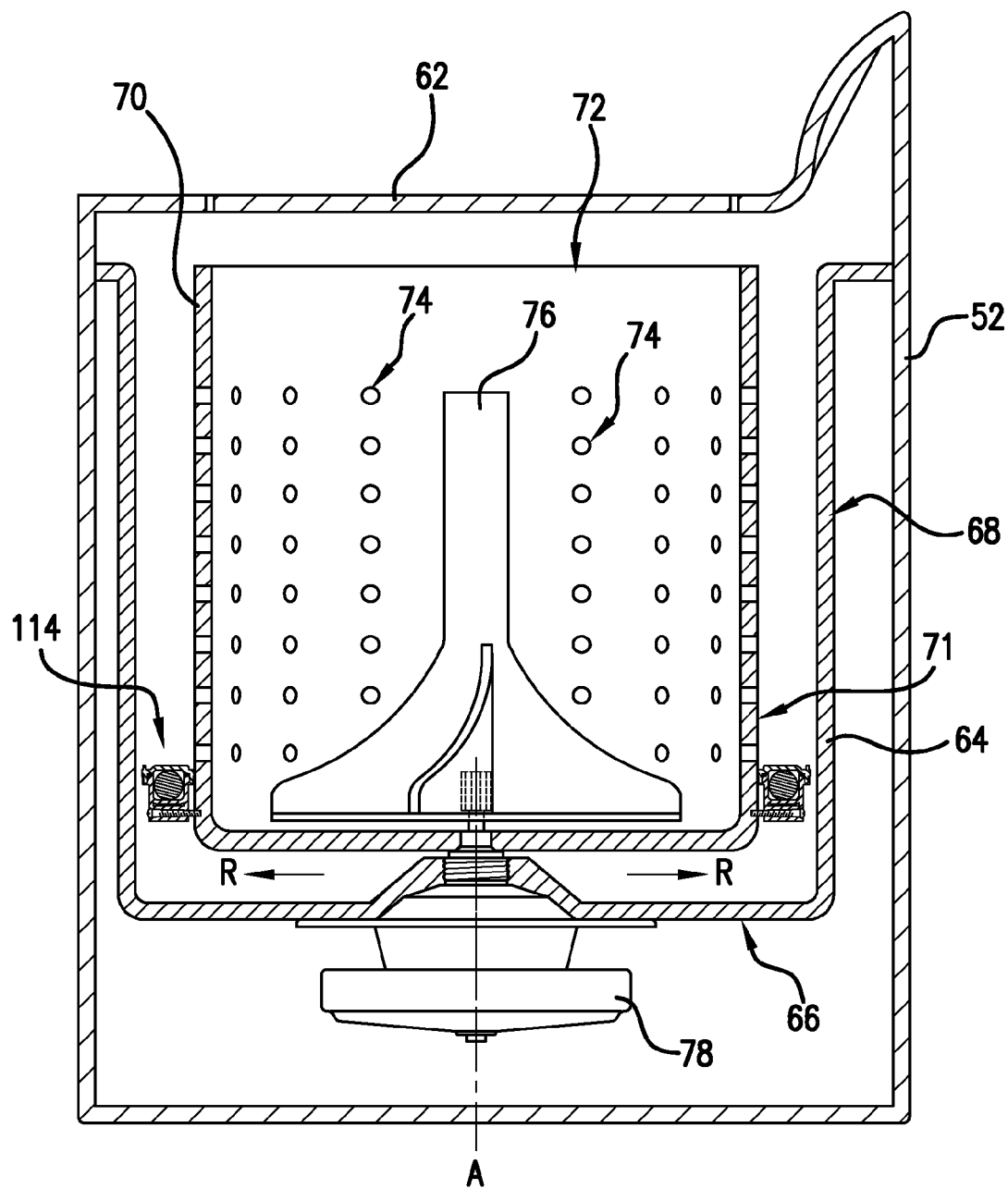
FIG. 2 provides a cross-sectional view of the exemplary embodiment of FIG. 1.

FIG. 1 is a perspective view of an exemplary vertical axis washing machine 50 including a cabinet 52 and a top cover 54. FIG. 2 is a side cross-sectional view of the exemplary embodiment of FIG. 1. While a vertical axis washing machine will be used to describe an exemplary embodiment of the present invention, it should be understood that the present invention is not limited to vertical axis washing machine and, instead, could be used with horizontal axis washing machines or even other appliances having a rotating element for which counterbalancing may be needed.

A backsplash 56 extends from cover 54, and a control panel 58 including a plurality of input selectors 60 is coupled to backsplash 56. Control panel 58 and input selectors 60 collectively form a user interface input for operator selection of machine cycles and features. For example, in one embodiment, a display 61 indicates selected features, a countdown timer, and/or other items of interest to machine users. A door or lid 62 is mounted to cover 54 and is rotatable about a hinge (not shown) between an open position (not shown) facilitating access to wash tub 64 located within cabinet 52, and a closed position (shown in FIG. 1) forming an enclosure over wash tub 64. Wash tub 64 includes a bottom wall 66 and a sidewall 68, and a basket 70 that is rotatably mounted within wash tub 64. A pump assembly (not shown) is located beneath tub 64 and basket 70 for gravity assisted flow when draining tub 64.

Referring now to FIG. 2, wash basket 70 is movably disposed and rotatably mounted in wash tub 64 in a spaced apart relationship from tub sidewall 68 and the tub bottom 66. Basket 70 includes an opening 72 for receiving wash fluid and a washload therein. Basket 70 includes a plurality of perforations 74 therein to facilitate fluid communication between an interior of basket 70 and wash tub 64.

An agitation element 76, such as a vane agitator, impeller, auger, or oscillatory basket mechanism, or some combination thereof is disposed in basket 70 to impart an oscillatory motion to articles and liquid in basket 70. In different embodiments, agitation element 76 includes a single action element (i.e., oscillatory only), double action (oscillatory movement at one end, single direction rotation at the other end) or triple action (oscillatory movement plus single direction rotation at one end, singe direction rotation at the other end). As illustrated in FIG. 2, agitation element 76 is oriented to rotate about a vertical axis A. Basket 70 and agitator 76 are driven by permanent magnet synchronous motor 78, which operates to turn or rotate agitator 76 and/or basket 70 with tub 64 as will be more fully described below.

Operation of machine 50 is controlled by a controller or processing device (not shown) that is operatively coupled to the user interface input 58 located on washing machine backsplash 56 (shown in FIG. 1) for user manipulation to select washing machine cycles and features. In response to user manipulation of the user interface input 58, the controller operates the various components of machine 50 to execute selected machine cycles and features.

In an illustrative embodiment, laundry items are loaded into basket 70, and washing operation is initiated through operator manipulation of control input selectors 60 (shown in FIG. 1). Wash tub 64 is filled with water and mixed with detergent to form a wash fluid. The contents of the basket 70 are agitated with agitation element 76 for cleansing of laundry items in basket 70. More specifically, agitation element 76 is moved back and forth in an oscillatory back and forth motion. In the illustrated embodiment, agitation element 76 is rotated clockwise a specified amount about the vertical axis of the machine, and then rotated counterclockwise by a specified amount. The clockwise/counterclockwise reciprocating motion is sometimes referred to as a stroke, and the agitation phase of the wash cycle constitutes a number of strokes in sequence. Acceleration and deceleration of agitation element 76 during the strokes imparts mechanical energy to articles in basket 70 for cleansing action. The strokes may be obtained in different embodiments with a reversing motor, a reversible clutch, or other known reciprocating mechanism.

After the agitation phase of the wash cycle is completed, tub 64 is drained with the pump assembly. Laundry items are then rinsed and portions of the cycle repeated, including the agitation phase, depending on the particulars of the wash cycle selected by a user. One or more spin cycles may also be used. In particular, a spin cycle may be applied after the wash cycle and/or after the rinse cycle in order to wring wash fluid from the articles being washed through openings 74 in basket 70. During a spin cycle, basket 70 is rotated at relatively high speeds. As previously indicated, imbalances in the wash basket 70 during the spin cycle can cause undesirable vibrations and even movement of washing machine 50.

Figure 3:
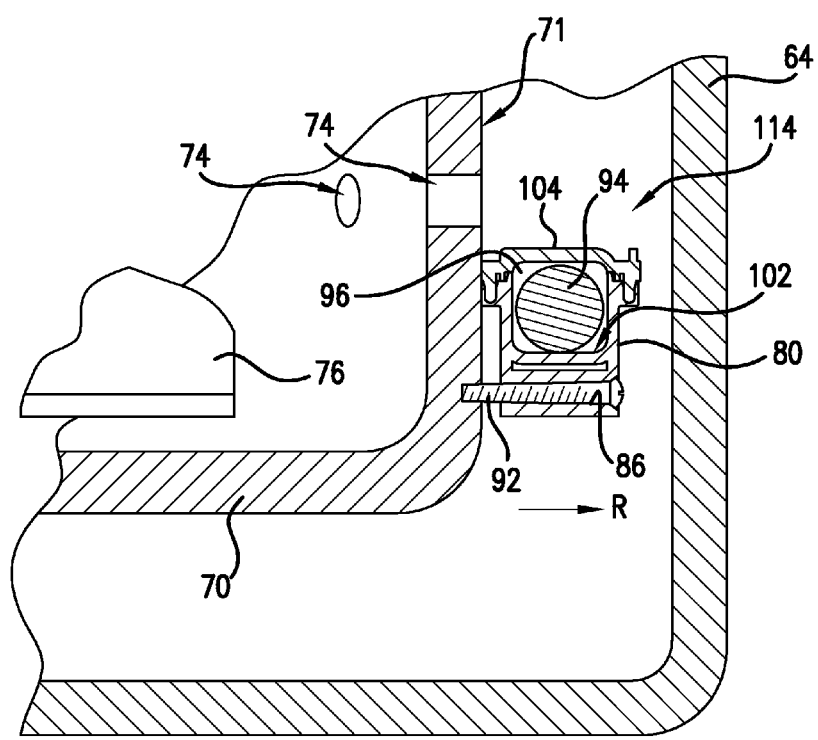
FIG. 3 is a cross-sectional view of a portion of the wash basket and wash bin of the exemplary appliance of FIG. 1.

Accordingly, wash basket 70 is equipped with a balance ring 114 as shown in FIGS. 2 and 3. Balance ring 114 includes a plurality of weights 94 that are movable within an annular space 96 contained within the toroid shaped balance ring 114. As previously described, weights 94 serve to counter balance an unbalance load during spinning of basket 70 to remove water and other fluids through holes 74. Although shown as spherically-shaped, weights 94 could also be provided as cylindrical or disc-shaped weights or in other configurations as well.

Balance ring 114 is attached to external surface 71 of wash basket 70 that extends circumferentially around the axis of rotation A of basket 70. A plurality of fasteners 92 are used to fixedly attach balance ring 114 to basket 70 at positions that circumferentially spaced about external surface 71. Fasteners 92 may be e.g., a bolt or screw that is extended through a fastener guide 82 (FIGS. 4-7) as will now be further described. Although shown in this exemplary embodiment as being mounted to the wash basket, it should be understood that the balance ring could be mounted to other rotating members of the appliance as well including e.g., the motor. Also, the balance ring could be mounted to the top, bottom, or both of the wash basket. As will be understood by one of skill in the art using the teachings disclosed herein, other configurations may be used as well.

Figure 4:
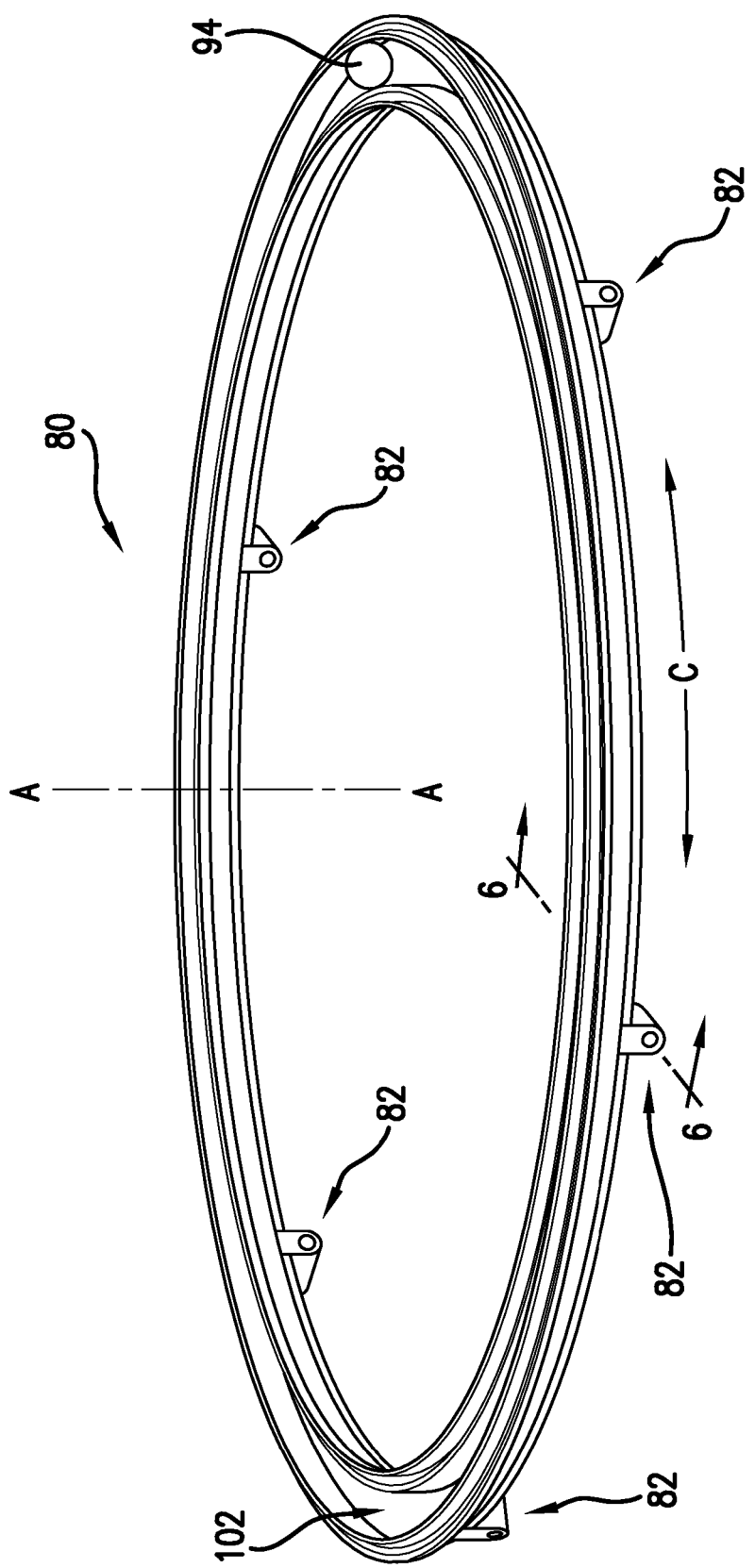
FIG. 4 is a perspective view of the lower portion of an exemplary embodiment of a balance ring of the present invention.

Referring now to FIG. 4, balance ring 114 is constructed from parts molded from one or more plastic materials. FIG. 3 provides a perspective view of the lower portion of balance ring 114. A movable weight 94 is shown in the annular space 96 defined in part by lower portion 114. Although only one weight 94 is shown, several weights 94 may be used. Additionally, annular space 96 may be filled with a fluid such as e.g., silicone, a water solution, or others. A plurality of fastener guides 82 are positioned along the bottom of balance ring 114. As shown, for this exemplary embodiment, fastener guides 82 are equally spaced along circumferential direction C of the balance ring 114. However, a variety of configurations including a different number of fastener guides than shown in FIG. 4 may be used as well.

During movement of basket 70, weights 94 move within annular space 96 and slide or roll across surface 102, which also extends circumferentially along balance ring 114. So that weights 94 may readily counter an imbalance in basket 70, it is desirable that surface 102 is relatively smooth—i.e. with little or no indentations, bumps, or the like. Accordingly, the present invention provides for eliminating or minimizing sink marks that could impede the movement of the counter weights.

Figure 5:
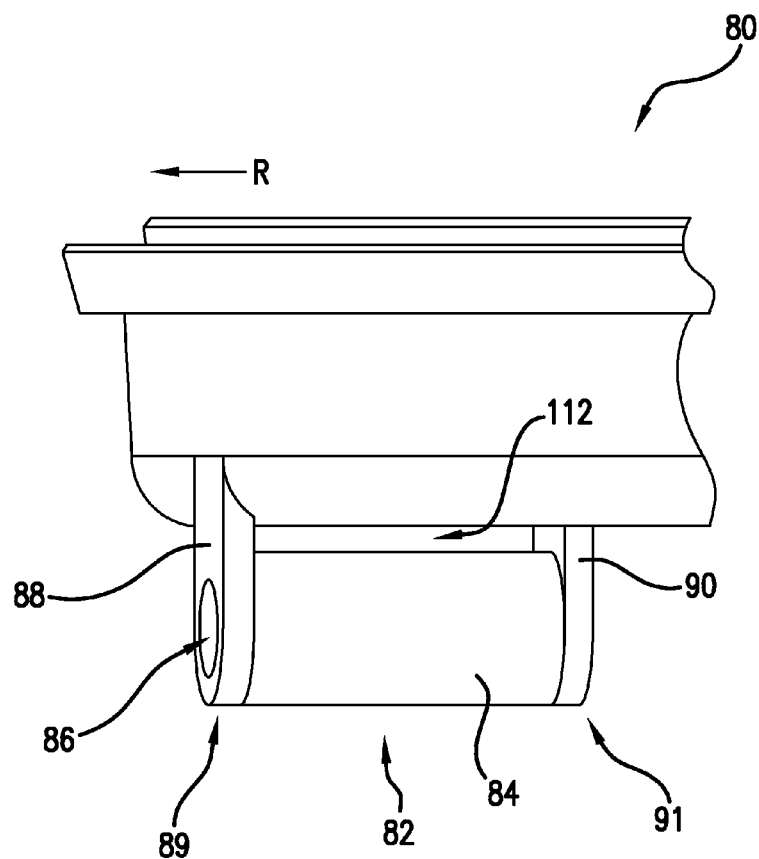
FIG. 5 is a close-up, perspective view of an exemplary embodiment of a fastener guide of the present invention.
Figure 6:
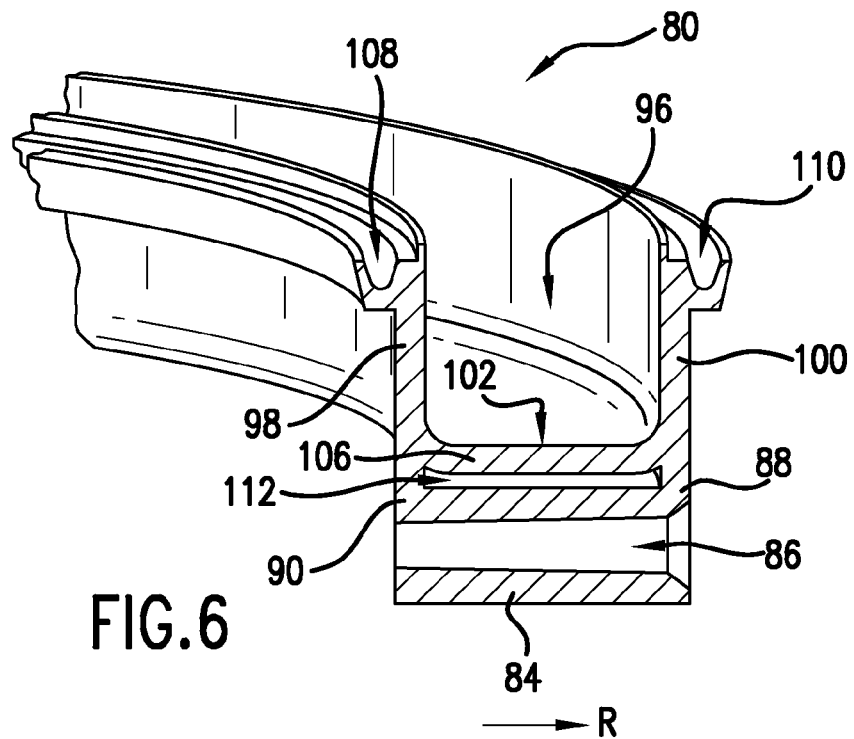
FIG. 6 provides a partial perspective and cross-sectional view of the lower portion of the balance ring shown in FIG. 4.

FIG. 5 provides a close-up, perspective view of the exemplary embodiment of a fastener guide 82 of the present invention extending from the lower portion 80 of balance ring 114. FIG. 6 provides a cross-sectional view of the lower portion 80 of balance ring 114 taken at a fastener guide 82. Also taken at the location of a fastener guide 82, FIG. 7 provides another cross-sectional view of the balance ring 114 including both the lower portion 80 as well as the top 104.

As shown, for this exemplary embodiment, faster guide 82 includes a radially outer leg 88 and radially inner leg 90 that project away from the bottom 106 of lower portion 80. More specifically, radially outer leg 88 extends in a linear manner below radially outer wall 98 while radially inner leg 90 extends in a linear manner below radially inner wall 100. Radially outer leg 88 and radially inner leg 90 are spaced apart along radial direction R.

At the distal ends 89 and 91 of legs 88 and 90, a channel or boss 84 extends along radial direction R between legs 88 and 90. Boss 84 includes an aperture 86 through which fastener 92 may be extended to basket 70. As shown in FIGS. 5, 6, and 7, a space 112 is present between boss 84 and the bottom 106 of balance ring 114. Accordingly, for this exemplary embodiment, legs 88 and 90 are the only features connecting boss 84 with ring 114. The construction of fastener guide 82, including the separation of boss 84 from ring 114, assists in eliminating or minimizing sink marks along surface 102 of balance ring 114. Accordingly, the movement of counter weights 94 about annular space 96 is enhanced during e.g., a spin cycle of appliance 50.

Figure 7:
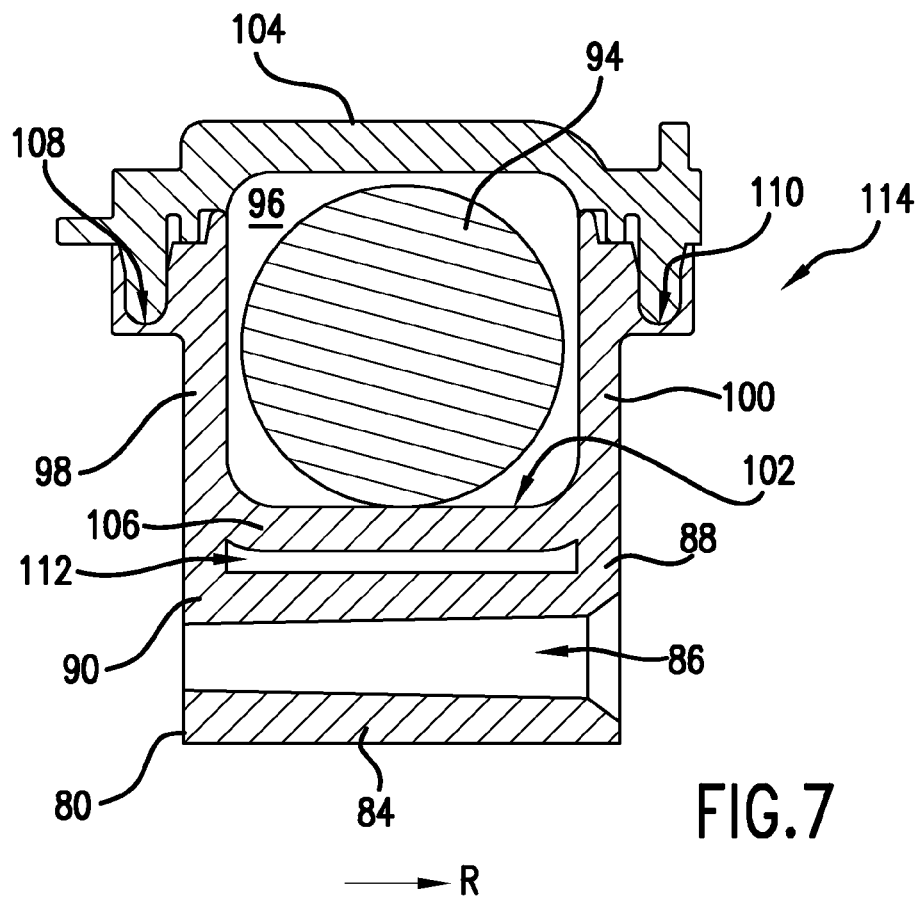
FIG. 7 is a cross-sectional view of an exemplary embodiment of a balance ring of the present invention.

Referring to FIG. 6, lower portion 80 of balance ring 114 includes a radially inner groove 108 and a radially outer groove 110 (both U-shaped) for receipt in complementary fashion of top 104 as shown in FIG. 7. Top 104 and bottom 106 can be sealed to retain fluids in annular space 96. The construction of balance ring 114 including fastener guide 82 as shown in the figures is by way of example only. Using the teaching disclosed in herein, one of skill in the art will understand the other configurations may be provided as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A washing machine, comprising:
   a wash tub;
   a wash basket mounted in said wash tub and rotatable about an axis of rotation, said wash basket having a wash basket opening for receiving wash fluid and a wash load therein, said wash basket including an external surface extending circumferentially about the axis of rotation of said wash basket;
   a motor in mechanical communication with said wash basket and configured for causing said wash basket to rotate;
   a balance ring mounted to an external surface of a rotating member of the washing machine, said balance ring configured to offset imbalances created by articles in the wash tub when said wash basket is rotated by said motor, said balance ring defining an annular space extending circumferentially;
   at least one fastener guide for attaching said balance ring to said wash basket, said fastener guide comprising:
      a pair of legs extending from said balance ring and spaced apart from each other along a radial direction that is perpendicular to the axis of rotation of said wash basket; and
      a boss comprising a solid cylindrical wall that extends along the radial direction and is connected to said pair of legs and extends therebetween without otherwise being connected to said balance ring, said solid cylindrical wall defining a passageway;
   a fastener received within the passageway of said solid cylindrical wall and extending along the radial direction to connect said balance ring to the rotating member of the washing machine,
   wherein said solid cylindrical wall, said pair of legs, and said balance ring define a space that provides separation between said solid cylindrical wall and said balance ring.

2. A washing machine as in claim 1, wherein said balance ring further comprises:
   a radially inner wall and a radially outer wall;
   wherein said pair of legs comprises a radially inner leg extending linearly from said radially inner wall and a radially outer leg extending linearly from said radially outer wall.

3. A washing machine as in claim 1, wherein said balance ring further comprises a plurality of fastener guides spaced circumferentially about said balance ring.

4. A washing machine as in claim 1, wherein said balance ring comprises a toroidal shape that encloses the annular space.

5. A washing machine as in claim 1, wherein the annular space of said balance ring includes a plurality of weights that are moveable within the annular space.

6. A washing machine as in claim 5, wherein said plurality of weights comprises a plurality of cylinders, balls, disks, or combination thereof.

7. A washing machine as in claim 1, wherein the washing machine is a vertical axis washing machine.

8. A washing machine as in claim 1, wherein the washing machine is a horizontal axis washing machine.

9. A washing machine as in claim 1, wherein said balance ring is positioned near a bottom portion of said wash basket.

10. A washing machine, comprising:
    a wash tub;
    a wash basket mounted in said wash tub and rotatable about an axis of rotation and configured for the receipt of laundry articles therein, said wash basket defining a wall extending circumferentially about said wash basket;
    a motor in mechanical communication with said wash basket and configured for causing said wash basket to rotate;
    a balance ring mounted to an external surface of the wall of said wash basket, said balance ring having an annular space extending circumferentially about said wash basket;
    at least one fastener guide for attaching said balance ring to the wall of said wash basket, said fastener guide comprising:
       a pair of legs extending from said balance ring;
       a boss comprising a solid cylindrical wall that extends between distal ends of said pair of legs and is otherwise separated from the balance ring, said solid cylindrical wall defining a passageway for the receipt of a fastener, the fastener being positioned within the opening of said solid cylindrical wall and extending along the radial direction to connect said balance ring to the wall of said wash basket,
    wherein said solid cylindrical wall, said pair of legs, and said balance ring define a space that provides separation between said solid cylindrical wall and said balance ring.

11. A washing machine as in claim 10, wherein said balance ring comprises a plastic, U-shaped portion from which said pair of legs extend.

12. A washing machine as in claim 10, further comprising a plurality of movable weights positioned in the annular space of said balance ring.

13. A washing machine as in claim 10, wherein said balance ring comprises a plastic.

14. A washing machine as in claim 10, wherein said balance ring is molded from plastic.

15. A washing machine, comprising:
    a wash tub;
    a wash basket mounted in said wash tub and rotatable about an axis of rotation, said wash basket having a wash basket opening for receiving wash fluid and a wash load therein, said wash basket including an external surface extending circumferentially about the axis of rotation of said wash basket;
    a motor in mechanical communication with said wash basket and configured for causing said wash basket to rotate;
    a balance ring mounted to an external surface of a rotating member of the washing machine, said balance ring configured to offset imbalances created by articles in the wash tub when said wash basket is rotated by said motor, said balance ring comprising an upper portion and a lower portion defining an annular space extending circumferentially;
    at least one fastener guide for attaching said balance ring to said wash basket, the fastener guide and the lower portion of the balance ring being injection molded as a unitary piece, said fastener guide comprising:
       a pair of legs extending from said balance ring and spaced apart from each other along a radial direction that is perpendicular to the axis of rotation of said wash basket; and
       a boss comprising a solid cylindrical wall that extends along the radial direction and is connected to said pair of legs and extends therebetween without otherwise being connected to said balance ring, said solid cylindrical wall defining a passageway;

a fastener received within the passageway of said solid cylindrical wall and extends connecting said balance ring to the rotating member of the washing machine,
wherein said solid cylindrical wall, said pair of legs, and said balance ring define a space that provides separation between said solid cylindrical wall and said balance ring.

\* \* \* \* \*